United States Patent
Kim

(10) Patent No.: US 7,746,899 B2
(45) Date of Patent: Jun. 29, 2010

(54) SYSTEM AND METHOD FOR CALCULATING BANDWIDTH OF MOBILE TERMINAL FOR STREAMING SERVICE

(75) Inventor: Young-Han Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 948 days.

(21) Appl. No.: 11/472,484

(22) Filed: Jun. 22, 2006

(65) Prior Publication Data

US 2007/0011346 A1    Jan. 11, 2007

(30) Foreign Application Priority Data

Jun. 23, 2005    (KR) .................... 10-2005-0054677

(51) Int. Cl.
H04J 3/16    (2006.01)

(52) U.S. Cl. .................. 370/468; 370/229; 370/395.21; 370/249; 455/454

(58) Field of Classification Search .................. 370/329, 370/468, 249; 455/454
See application file for complete search history.

(56) References Cited

U.S. PATENT DOCUMENTS

| | | | |
|---|---|---|---|
| 6,285,886 B1* | 9/2001 | Kamel et al. | 455/522 |
| 6,763,392 B1* | 7/2004 | del Val et al. | 709/231 |
| 6,792,449 B2* | 9/2004 | Colville et al. | 709/215 |

(Continued)

FOREIGN PATENT DOCUMENTS

EP    1 271 953 A2    1/2003

OTHER PUBLICATIONS

ETSI TS 126 234, ETSI Standards, Telecommunications Standards Institute, vol. 3-SA4, No. V630, pp. 1-125, (Mar. 2005). XP 014027760.
M. Westerlund, IETF RFC 3890, (Online), pp. 1-19, (Sep. 2004). XP002399633.
ETSI TS 123 107, ETSI Standards, vol. 3-SA2, No. V630, pp. 1-41, (Jun. 17, 2005). XP014030493.
Schulzrinne H. et al., Network Working Group Request for Comments, XX, XX, pp. 1-41, (Apr. 1998). XP002230868.
Handley M. et al., Network Working Group Request for Comments, pp. 1-42, (Apr. 1998). XP 002278846.

(Continued)

*Primary Examiner*—Rafael Pérez-Gutiérrez
*Assistant Examiner*—Issam Chakour
(74) *Attorney, Agent, or Firm*—Birch, Stewart, Kolasch & Birch, LLP

(57) ABSTRACT

A method of calculating a bandwidth for a mobile terminal including requesting, by the mobile terminal, a description of a streaming content from a network and receiving a response from the network, requesting, by the mobile terminal, a Quality of Service (QoS) value corresponding to a required amount of bandwidth resources of the network for receiving a streaming service of the contents from information about the content included in the received response, and receiving, by the mobile terminal, allocated bandwidth resources of the network according to the QoS value.

13 Claims, 4 Drawing Sheets

U.S. PATENT DOCUMENTS

| | | |
|---|---|---|
| 6,996,104 B2 * | 2/2006 | Trossen et al. ............... 370/390 |
| 7,272,651 B1 * | 9/2007 | Bolding et al. ............... 709/227 |
| 2002/0133600 A1 * | 9/2002 | Williams et al. ............ 709/228 |
| 2004/0218035 A1 * | 11/2004 | Crook ..................... 348/14.02 |
| 2005/0063330 A1 * | 3/2005 | Lee et al. ..................... 370/328 |
| 2005/0159166 A1 * | 7/2005 | Jonsson et al. ........... 455/452.2 |
| 2005/0213509 A1 * | 9/2005 | Collomb et al. ............. 370/252 |

OTHER PUBLICATIONS

Montes et al., IEEE Perosnal Communications, IEEE Communications Society, US, vol. 9, No. 5, pp. 84-92, (Oct. 2002). XP011093881.

* cited by examiner

SYSTEM AND METHOD FOR CALCULATING BANDWIDTH OF MOBILE TERMINAL FOR STREAMING SERVICE

This application claims priority to Korean Patent Application No. 10-2005-0054677 filed on Jun. 23, 2006, in Korea, the entire contents of which is hereby incorporated by reference in its entirety.

BACKGROUND OF THE INVENTION

1. Field of the Invention

The present invention relates to a mobile terminal, and more particularly to a system and method for calculating a bandwidth of the mobile terminal for a streaming service.

2. Description of the Related Art

Currently, multimedia data is a significant part of Internet traffic and applications. That is, multimedia services such as Internet telephony, video conferencing, and video-on-demand (VOD) service are becoming more popular and thus are becoming a bigger part of the overall Internet Traffic. In addition, because multimedia data files are typically large in size (i.e., have a large capacity), the multimedia files are streamed from a server/network to a user, rather than having the entire file downloaded to the user/terminal and then playing the file. In the streaming service, the data is streamed and processed by the user's terminal as it arrives. Thus, the entire file does not have to be first downloaded. Video on Demand (VOD) and Audio on Demand (AOD) are examples of streaming services.

In addition, a variety of protocols are used in the streaming service such as the RTSP (Real Time Streaming Protocol) and the TCP (Transmission Control Protocol). A combination of the RTP (Real-Time Transport Protocol) and the UDB (User Datagram Protocol) may also be used. In addition, the packet data protocol (PDP) based upon the 3rd generation partnership project (3 GPP) specification is also used to perform a bandwidth negotiation process between the mobile terminal and the corresponding network for transmission of actual data packets.

For example, FIG. 1 is a flowchart showing a general procedure for allocating a bandwidth between the mobile terminal and the network. As shown, the mobile terminal first calculates a maximum bit rate (MBR) required by the mobile terminal and a guaranteed bit rate (GBR) (step S110), and then creates a PDP context based upon the calculated results (step S120). The mobile terminal then transmits the PDP context to the network to thereby request a particular QoS (Quality of Service) (step S130). The network then provides the mobile terminal with the requested (QOS without any change (S104). Alternatively, the network may allocate a maximum QoS value, namely, a particular bandwidth that can be supported during the corresponding time period.

Thus, because the network accepts the bandwidth request as it is or allocates the maximum available QoS value according to the situation or conditions of a corresponding time period, the same QoS cannot be guaranteed to all users, even though all the users pay the same cost for the service (e.g., fees or charges for air time, downloading, receiving multimedia data services, etc.). Thus, certain users will get a lower QoS, which is unfair to those particular users. Further, the management of radio resources is not effective.

SUMMARY OF THE INVENTION

Accordingly, one object of the present invention is to address the above noted and other objects.

Another object is to improve the process of bandwidth allocation for mobile terminals receiving a streaming service.

Yet another object of the present invention is to provide a system and method for calculating a bandwidth of a mobile terminal for a streaming service in which the mobile terminal accurately calculates a bandwidth to be used.

To achieve at least the above features in whole or in parts, there is provided in one aspect a method for calculating a bandwidth for a mobile terminal, which includes requesting, by the mobile terminal, a description of a streaming content from a network and receiving a response from the network, requesting, by the mobile terminal, a Quality of Service (QoS) value corresponding to a required amount of bandwidth resources of the network for receiving a streaming service of the contents from information about the content included in the received response, and receiving, by the mobile terminal, allocated bandwidth resources of the network according to the QoS value.

In another aspect, the present invention provides a system for calculating a bandwidth, which includes a network server including a plurality of streaming contents, a mobile terminal configured to request a streaming content from the network server, and a base station configured to serve as a medium between the network server and the mobile terminal and to transfer messages from the mobile terminal to the network server and messages from the network server to the mobile terminal. Further, the mobile terminal transmits a request message requesting the streaming content to the network server via the base station, and the network server transmits a response to the mobile terminal via the base station, which includes information about the requested streaming content. In addition, the mobile terminal calculates a Quality of Service (QoS) value corresponding to a required amount of bandwidth resources of the network for receiving a streaming service of the content from the information about the streaming content.

In yet another aspect, the present invention provides a mobile terminal, which includes a transceiver configured to request a description of a streaming content from a network and to receive a response from the network, a bit rate calculator configured to calculate a Quality of Service (QoS) value corresponding to a required amount of bandwidth resources for receiving a streaming service of the streaming content from information about the streaming content included in the received response, and a processor configured to control the transceiver and the bit rate calculator.

Additional advantages and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF THE INVENTION

The below description of present invention refers to a 3 GPP type mobile communication system. However, the present invention may also be used in communication systems operating under other types of communication specifications such as the 3 GPP2, 4 G, IEEE, OMA, etc. communication specifications.

Figure 1:
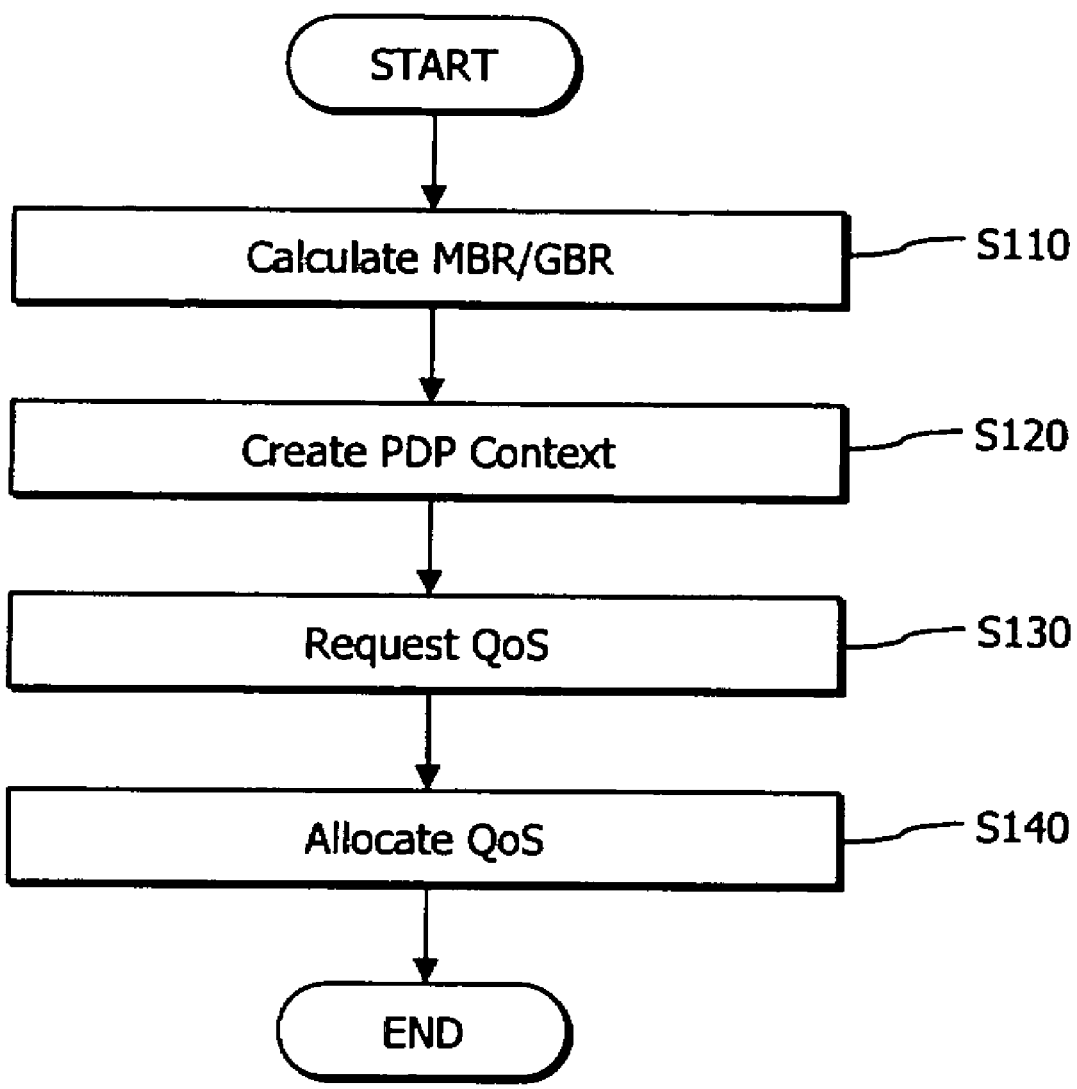
FIG. 1 is a flowchart illustrating a related art method for allocating a bandwidth between a mobile terminal and a network.
Figure 2:
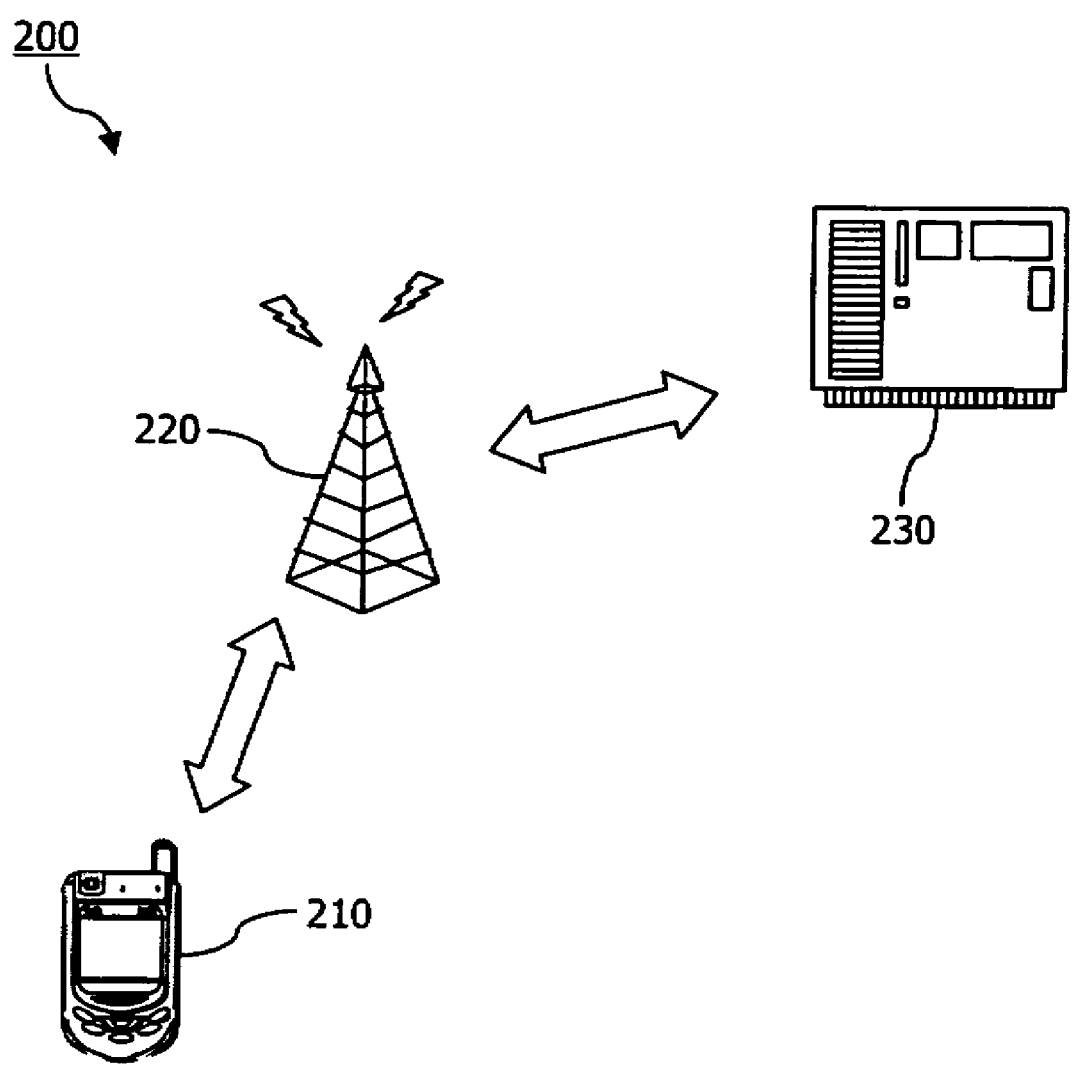
FIG. 2 is an overview illustrating a system for implementing a method for calculating a bandwidth of a mobile terminal for a streaming service in accordance with the present invention.

Turning first to FIG. 2, which shows a streaming service communication system 200 in accordance with the present invention. As shown, the system 200 includes a mobile terminal 210 for requesting streaming contents be downloaded from a server 230. The server 230 then transmits the desired contents via a streaming service to the mobile terminal 210. Further, the system 200 also includes a base station 220 serving as a medium between the mobile terminal 210 and the server 230.

In addition, as will be discussed in more detail with reference to FIG. 3, the mobile terminal 210 calculates a first QoS value according to an audio bandwidth and a video bandwidth of the contents based on a multimedia session message included in a response from the server 230, calculates a second QoS value according to 1) the first QoS value, 2) a real-time transport control protocol (RTCP) overhead, and 3) a radio link control (RLC) overhead, and then calculates a final QoS value according where the second QoS value falls within a range of predetermined QoS's provided by the network. The mobile terminal 210 then creates a PDP context based upon the calculated final QoS value and transmits the PDP context to the server 230 through the base station 220. The server 230 then receives the PDP context and allocates appropriate bandwidth resources to the mobile terminal 210 according to the final QoS value.

Figure 3:
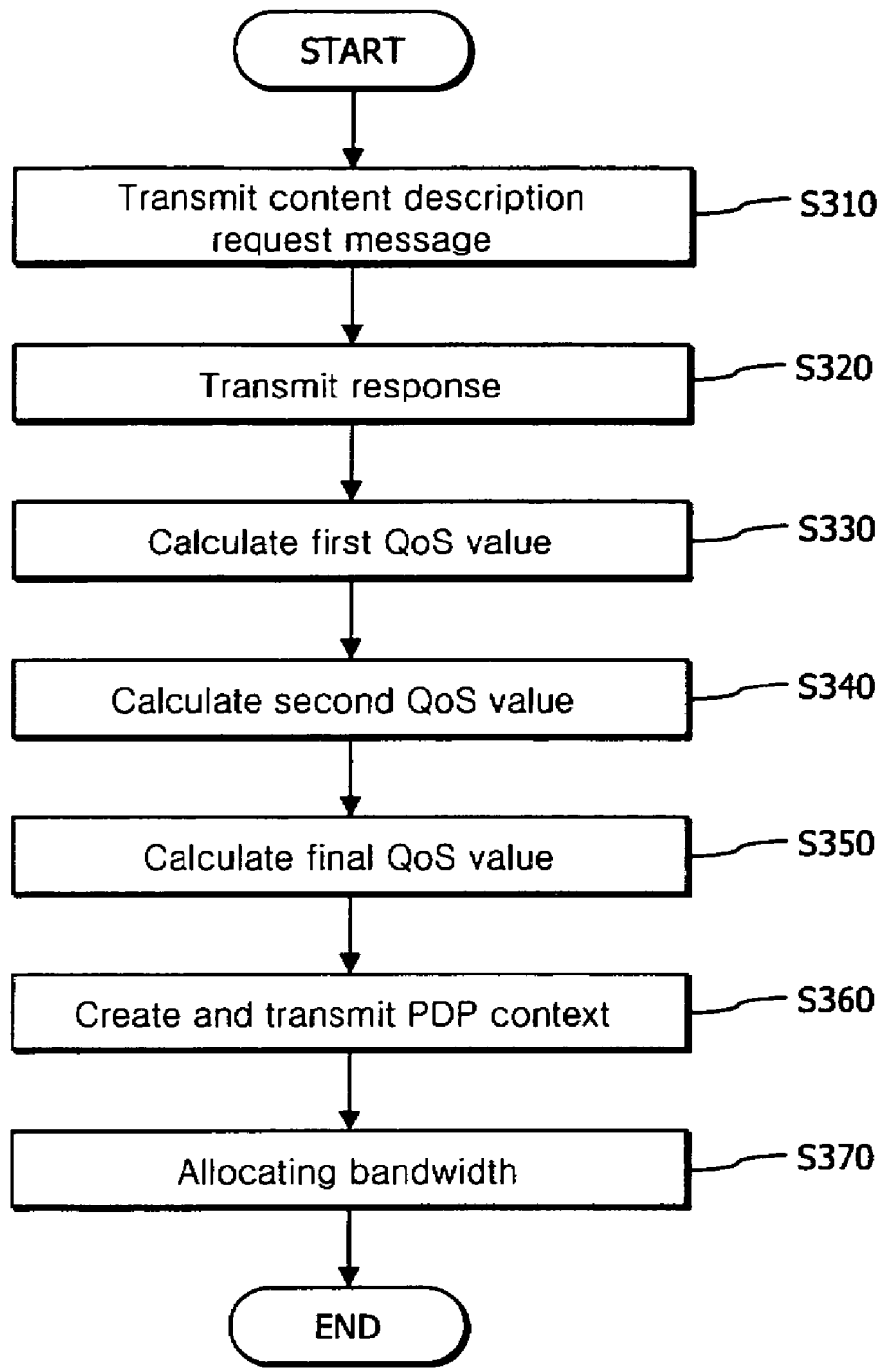
FIG. 3 is a flowchart showing a method for calculating a bandwidth of a mobile terminal for a streaming service in accordance with the present invention.

In more detail, FIG. 3 is a flowchart illustrating a method for calculating a bandwidth for the mobile terminal for a streaming service in accordance with the present invention. FIG. 2 will also be referred to in this description. As shown, the mobile terminal 210 first transmits a content description request message to the server 230 including information about the contents the user wants to stream (S310). This is generally referred to as the RTSP session initialization step, and the request message generally is a DESCRIBE RTSP message. Then, upon receiving the request message, the streaming server 230 transmits a multimedia session message such as a session description protocol (SDP) message to the mobile terminal 210 (step S320) via the base station 220. The multimedia SDP message includes content information such as an audio bandwidth, a video bandwidth, coding information, or bit rate information of the contents to be transmitted through a corresponding RTSP session.

Next, upon receiving the response from the streaming server 230, the mobile terminal 210 reads the information contained in the multimedia session message and calculates a first QoS value for the requested content (step S330). In more detail, the mobile terminal 210 calculates the first QoS value by adding the audio bandwidth and the video bandwidth of the content as shown in the below Equation 1:

$$1^{st} \text{QoS} = \text{audio bandwidth} + \text{video bandwidth}. \quad \text{(Equation 1)}$$

After calculating the first QoS value, the mobile terminal 210 calculates a second QoS value based on the first QoS value, an RTCP overhead, and an RLC overhead (step S340). That is, the second QoS value is calculated such that a value obtained by adding 1 to the RTCP overhead is multiplied to the first QoS value, to which a value obtained by adding 1 to the RLC overhead is multiplied. In more detail, the below Equation 2 illustrates the calculation of the second QoS:

$$2^{nd} \text{QoS} = 1^{st} \text{QoS}*(1+\text{RTCP\_DL\_OVERHEAD})*(1+\text{RLC\_OVERHEAD}) \quad \text{(Equation 2)}$$

Here, the RTCP overhead is an RTCP downlink (DL) overhead value, which is an RTCP control message traffic value of about 2.5 percent of a corresponding RTP bandwidth, and the RLC overhead is a re-transmission overhead value in an RLC network of about 5 percent of an overall bandwidth.

After calculating the second QoS value, the mobile terminal 210 calculates a final QoS value based on where the second QoS falls within a range of previously defined QoS (such as download bit rates, for example) that the network may provide (step S350). This feature will be discussed in more detail with the example shown in Table 1 indicates example of parameters that may be used to implement invention. As shown, Table 1 includes a plurality of predefined uplink bit rates, as well as the overhead definitions.

TABLE 1

| Downlink bit rate | Uplink bit rate |
|---|---|
| Supported Streaming (Radio Access Bearer) RABs | |
| 16 | 8 |
| 32 | 8 |
| 64 | 16 |
| 128 | 16 |
| Overhead Definition | |
| RTCP_DL_OVERHEAD | 0.025 |
| RLC_OVERHEAD | 0.05 |

Thus, in this example, if the calculated second QoS value is 16 or smaller, the final QoS value is selected as 16, and if the second QoS value is greater than 16 but 32 or smaller, the final QoS value is selected as 32. In addition, if the second QoS value is greater than 32 but 64 or smaller, the final QoS value is selected as 64, and if the second QoS value is greater than 64 but 128 or smaller, the final QoS value is selected 128.

After calculating the final QoS value, the mobile terminal creates a PDP context based upon the final QoS value and transmits the PDP context to the network (step S360). Upon receiving the PDP context from the mobile terminal, the network allocates its network bandwidth resources to the mobile terminal 210 according to the final QoS value requested by the mobile terminal 210 (step S370).

Figure 4:
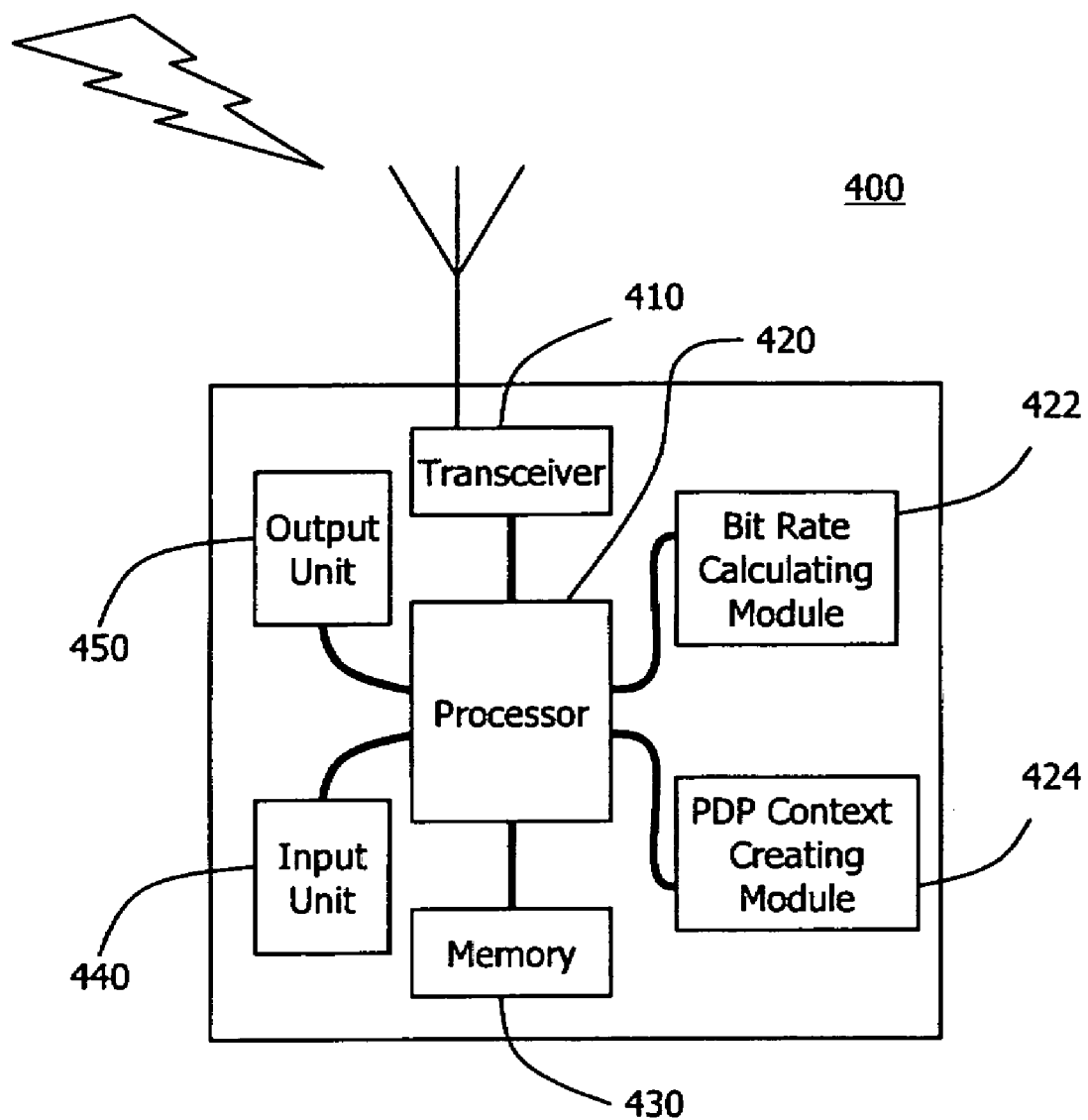
FIG. 4 is a block diagram of mobile station in accordance with the present invention.

Turning next to FIG. 4, which shows a block diagram of a mobile station 400 that supports the features of the present invention. As shown, the mobile station 400 includes an RF transceiver 410 to send and receive signals and data, a memory 430 to store data and information, and a processor 420 cooperating with the transceiver 410 and memory 430 to handle various required processing procedures. In addition, the processor 420 may cooperate with different hardware and/or software components (modules) that are part of the processor 420 and/or are separate entities such as a bit rate calculating module 422, and a PDP context creating module 424. Thus, the processor 420 may control the various components of the terminal 400 to implement the method of effectively and accurately calculating appropriate (necessary) amounts of bandwidth for a desired streaming content. The mobile terminal 400 also includes an input unit 440 (e.g., microphone, keypad, function buttons, touch-sensitive input device, etc. to allow audible, visual, and/or tactile inputs) and an output unit 450 (e.g., speaker, display unit, touch-screen, vibration unit, etc. to provide audible, visual, and/or tactile outputs).

As so far described, the method for calculating a bandwidth of the mobile terminal for a streaming service in accordance with the present invention has many advantages. For example, because the mobile terminal itself calculates an accurate bandwidth value to be used using the content information of the multimedia session message included in the response of the server, the network can effectively allocate its limited network bandwidth resources to multiple mobile terminals such that optimal fairness is achieved and radio resources can be managed more efficiently.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits whereby interconnecting an appropriate network of conventional computer circuits, as will be readily apparent to those skilled in the art.

Any portion of the present invention implemented on a general purpose digital computer or microprocessor includes a computer program product which is a storage medium including instructions which can be used to program a computer to perform a process of the invention. The storage medium can include, but is not limited to, any type of disk including floppy disk, optical disk, CD-ROMs, and magneto-optical disks, ROMs, RAMs, EPROMs, EEPROMs, magnetic or optical cards, or any type of media suitable for storing electronic instructions.

What is claimed is:

1. A method of calculating a bandwidth for a mobile terminal, the method comprising:
   requesting, by the mobile terminal, a description of a streaming content from a network and receiving a response from the network;
   requesting, by the mobile terminal, a Quality of Service (QoS) value corresponding to a required amount of bandwidth resources of the network for receiving a streaming service of the content from information about the content included in the received response; and
   receiving, by the mobile terminal, allocated bandwidth resources of the network according to the QoS value,
   wherein the mobile terminal calculates the QoS by calculating a first QoS value, calculating a second QoS value based on the first QoS value, and then calculating a final QoS based on where the calculated second QoS falls within a range of predetermined QoSs that the network provides,
   wherein the multimedia session message includes information about the content to be transmitted through a corresponding session,
   wherein the information of the content includes an audio bandwidth, a video bandwidth, coding information, and bit rate information,
   wherein the first QoS is calculated by adding the audio bandwidth and the video bandwidth included in the multimedia session message from the network, and
   wherein the second QoS is calculated based on the following equation:

$$QoS = 1^{st}QoS*(1+RTCP\_DL\_OVERHEAD)*(1+RLC\_OVERHEAD),$$

where the RTCP_DL_OVERHEAD is an RTCP downlink (DL) overhead value and the RLC_OVERHEAD is a re-transmission overhead value, both of which are also included in the multimedia session message received from the network.

2. The method of claim 1, wherein the network comprises at least one streaming server.

3. The method of claim 1, wherein the request for description of the content comprises a description real time streaming protocol (RTSP) message.

4. The method of claim 1, wherein the response received by the mobile terminal from the network is a multimedia session message, and the mobile terminal calculates the QoS value from information contained in the multimedia session message.

5. The method of claim 4, wherein the multimedia session message is a session description protocol (SDP) message.

6. The method of claim 1, wherein the range of predetermined QoSs that the network provides includes at least values A, B, C and D.

7. The method of claim 6, wherein:
   if the second QoS value is less than or equal to the value A, the final QoS value is selected as the value A;
   if the second QoS value is greater than the value A, but not greater than value B, the final QoS value is selected as the value B;
   if the second QoS value is greater than the value B, but not greater than the value C, the final QoS value is selected as the value C;
   if the second QoS value is greater than value C, but not greater than value the D, the final QoS value is selected as the value D.

8. A system for calculating a bandwidth, comprising:
   a network server including a plurality of streaming contents;
   a mobile terminal configured to request a streaming content from the network server; and
   a base station configured to serve as a medium between the network server and the mobile terminal and to transfer messages from the mobile terminal to the network server and messages from the network server to the mobile terminal,
   wherein the mobile terminal transmits a request message requesting the streaming content to the network server via the base station, and the network server transmits a response to the mobile terminal via the base station, which includes information about the requested streaming content,
   wherein the mobile terminal calculates a Quality of Service (QoS) value corresponding to a required amount of bandwidth resources of the network for receiving a streaming service of the content from the information about the streaming content,
   wherein the mobile terminal calculates the QoS by calculating a first QoS value, calculating a second QoS value based on the first QoS value, and then calculating a final QoS based on where the calculated second QoS falls within a range of predetermined QoSs that the network server provides,
   wherein the information about the streaming content included in the response from the network server includes an audio bandwidth, a video bandwidth, coding information, and bit rate information,
   wherein the first QoS is calculated by adding the audio bandwidth and the video bandwidth included in the response from the network, and
   wherein the second QoS is calculated based on the following equation:

$$QoS = 1^{st}QoS*(1+RTCP\_DL\_OVERHEAD)*(1+RLC\_OVERHEAD),$$

where the RTCP_DL_OVERHEAD is an RTCP downlink (DL) overhead value and the RLC_OVERHEAD is a re-transmission overhead value, both of which are also included in the response received from the network.

9. The system of claim 8, wherein the request for the streaming content comprises a description real time streaming protocol (RTSP) message, and the response received by the mobile terminal from the network server is a session description protocol (SDP) multimedia message.

10. The system of claim 8, wherein the range of predetermined QoSs that the network provides includes at least values A, B, C and D.

11. The system of claim 10, wherein:
if the second QoS value is less than or equal to the value A, the final QoS value is selected as the value A;
if the second QoS value is greater than the value A, but not greater than value B, the final QoS value is selected as the value B;
if the second QoS value is greater than the value B, but not greater than the value C, the final QoS value is selected as the value C;
if the second QoS value is greater than value C, but not greater than value the D, the final QoS value is selected as the value D.

12. A mobile terminal, comprising:
a transceiver configured to request a description of a streaming content from a network and to receive a response from the network; and
a processor configured to control the transceiver and to calculate a Quality of Service (QoS) value corresponding to a required amount of bandwidth resources for receiving a streaming service of the streaming content from information about the streaming content included in the received response,
wherein the processor calculates the QoS by calculating a first QoS value, calculating a second QoS value based on the first QoS value, and then calculating a final QoS based on where the calculated second QoS falls within a range of predetermined QoSs that the network provides,
wherein the information of the content includes an audio bandwidth, a video bandwidth, coding information, and bit rate information,
wherein the first QoS is calculated by adding the audio bandwidth and the video bandwidth included in the response from the network, and
wherein the second QoS is calculated based on the following equation:

$$QoS = 1^{st}QoS * (1 + RTCP\_DL\_OVERHEAD) * (1 + RLC\_OVERHEAD).$$

where the RTCP_DL_OVERHEAD is an RTCP downlink (DL) overhead value and the RLC_OVERHEAD is a re-transmission overhead value, both of which are also included in the response received from the network.

13. The mobile terminal of claim 12, wherein the range of predetermined QoSs that the network provides includes at least values A, B, C and D, and
wherein:
if the second QoS value is less than or equal to the value A, the final QoS value is selected as the value A;
if the second QoS value is greater than the value A, but not greater than value B, the final QoS value is selected as the value B;
if the second QoS value is greater than the value B, but not greater than the value C, the final QoS value is selected as the value C;
if the second QoS value is greater than value C, but not greater than value the D, the final QoS value is selected as the value D.

* * * * *